(12) United States Patent
Alcorn et al.

(10) Patent No.: US 10,992,534 B2
(45) Date of Patent: Apr. 27, 2021

(54) FORMING GROUPS OF NODES FOR ASSIGNMENT TO A SYSTEM MANAGEMENT SERVER

(71) Applicant: Lenovo Enterprise Solutions (Singapore) Pte. Ltd., Singapore (SG)

(72) Inventors: Matthew R. Alcorn, Durham, NC (US); James G. McLean, Raleigh, NC (US); Fred Allison Bower, III, Durham, NC (US); Antonio Abbondanzio, Raleigh, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/567,590

(22) Filed: Sep. 11, 2019

(65) Prior Publication Data
US 2021/0075682 A1   Mar. 11, 2021

(51) Int. Cl.
*H04L 12/24*   (2006.01)
*H04L 29/08*   (2006.01)

(52) U.S. Cl.
CPC .......... *H04L 41/0893* (2013.01); *H04L 41/12* (2013.01); *H04L 67/10* (2013.01)

(58) Field of Classification Search
CPC ...... H04L 41/0893; H04L 41/12; H04L 67/10
See application file for complete search history.

(56) References Cited

U.S. PATENT DOCUMENTS 8,954,557 B2 * 2/2015 Gusev ................... G06F 9/5061
                                                    709/223
2013/0326036 A1 * 12/2013 Heumesser ........... G06F 9/5083
                                                    709/223
2016/0359680 A1 * 12/2016 Parandehgheibi ...... H04L 43/10
2017/0006135 A1 *  1/2017 Siebel .................... G06N 5/003
2017/0149864 A1 *  5/2017 Feiman .................. H04L 67/10
2017/0180211 A1 *  6/2017 Johnson .............. H04L 41/0893
2018/0027058 A1 *  1/2018 Balle ................... G06F 13/4068
                                                    709/226
2018/0295029 A1 * 10/2018 Shivanna ............... H04L 67/10
2019/0050164 A1 *  2/2019 Kotian .................. G06F 3/0604
2019/0349257 A1 * 11/2019 Wang ..................... H04L 41/12

OTHER PUBLICATIONS

Oracle® Clusterware—Clusterware Administration and Deployment Guide. Oracle.com. Feb. 2019. pp. 1-879. (Year: 2019).*

* cited by examiner

*Primary Examiner* — John M Macilwinen
(74) *Attorney, Agent, or Firm* — Jeffrey Streets

(57) ABSTRACT

An apparatus and a computer program product provide program instructions executable by a processor to perform operations. The operations include identifying a plurality of system management servers in a computer system and a node management capacity for each system management server, identifying a plurality of nodes in the computer system and a value of a node operating factor for each node, and dividing the plurality of nodes into groups, wherein each of the nodes in a group has the same value of the node operating factor. The operations further include assigning each one of the groups of nodes to one of the system management servers, wherein a sum of the nodes assigned to each system management server does not exceed the node management capacity of the system management server, and managing, for each system management server, the group of nodes that are assigned to the system management server.

22 Claims, 7 Drawing Sheets

FORMING GROUPS OF NODES FOR ASSIGNMENT TO A SYSTEM MANAGEMENT SERVER

BACKGROUND

The present disclosure relates to the management of a computer system including numerous nodes of computer hardware that require multiple system management servers.

BACKGROUND OF THE RELATED ART

Enterprise computer systems may include numerous nodes, including servers, multi-server chassis, storage systems, switches, and other types of hardware. Maintaining and operating all of these nodes can become complex. Most large computer systems include a system management server that runs a system management application to facilitate management of the various nodes.

Such system management applications or tools are increasing in capability and scale. However, a large computer system may need multiple instances of a system management application in order to manage each of the nodes across the entire computer system. Furthermore, a particular computer system may be expanded over time as nodes of various types are added to the computer system to meet rising demand for capacity and availability. System management may be further complicated where the computer system includes a range of different attributes, such as multiple operating systems, workload types, or network configurations.

BRIEF SUMMARY

Some embodiments provide a computer program product comprising a non-volatile computer readable medium and non-transitory program instructions embodied therein, the program instructions being configured to be executable by a processor to perform operations. The operations comprise identifying a plurality of system management servers in a computer system and a node management capacity for each system management server, identifying a plurality of nodes in the computer system and a value of one or more node operating factors for each node, and dividing the plurality of nodes into groups, wherein each of the nodes in a group has the same value of the one or more node operating factors. The operations further comprise assigning each one of the groups of nodes to one of the system management servers, wherein a sum of the nodes assigned to each system management server does not exceed the node management capacity of the system management server, and managing, for each system management server, the group of nodes that are assigned to the system management server.

Some embodiments provide an apparatus comprising at least one non-volatile storage device storing program instructions and at least one processor configured to process the program instructions, wherein the program instructions are configured to, when processed by the at least one processor, cause the apparatus to perform operations. The operations comprise identifying a plurality of system management servers in a computer system and a node management capacity for each system management server, identifying a plurality of nodes in the computer system and a value of one or more node operating factors for each node, and dividing the plurality of nodes into groups, wherein each of the nodes in a group has the same value of the one or more node operating factors. The operations further comprise assigning each one of the groups of nodes to one of the system management servers, wherein a sum of the nodes assigned to each system management server does not exceed the node management capacity of the system management server, and managing, for each system management server, the group of nodes that are assigned to the system management server.

DETAILED DESCRIPTION

Figure 1A:
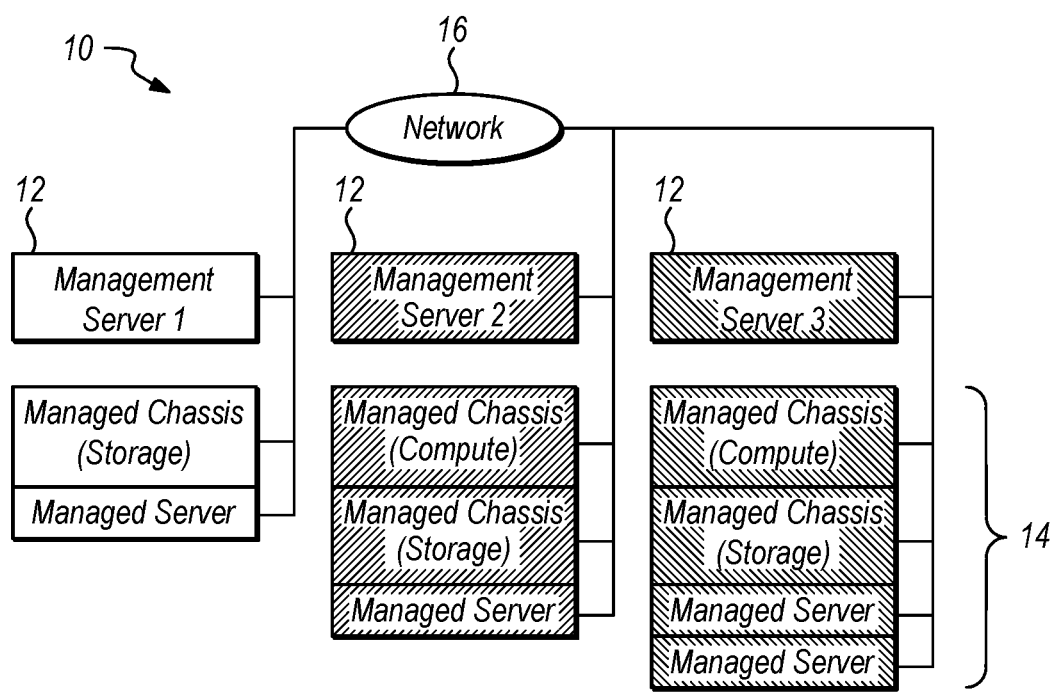
FIG. 1A is a diagram of a computer system including three management servers that each manage a plurality of nodes.

One embodiment provides a computer program product comprising a non-volatile computer readable medium and non-transitory program instructions embodied therein, the program instructions being configured to be executable by a processor to perform operations. The operations comprise identifying a plurality of system management servers in a computer system and a node management capacity for each system management server, identifying a plurality of nodes in the computer system and a value of one or more node operating factors for each node, and dividing the plurality of nodes into groups, wherein each of the nodes in a group has the same value of the one or more node operating factors. The operations further comprise assigning each one of the groups of nodes to one of the system management servers, wherein a sum of the nodes assigned to each system management server does not exceed the node management capacity of the system management server, and managing, for each system management server, the group of nodes that are assigned to the system management server.

The computer system may include various types of hardware nodes, such as servers, switches and network attached storage devices. Furthermore, the computer system may have any topology without limitation. However, the computer system may have a plurality of system management servers that are used, at least in-part, to manage the nodes of the computer system. Each system management server has a node management capacity that limits how many nodes that the system management server can nominally manage. The node management capacity may vary between the system management servers within the computer system. When the number of nodes in the computer system exceeds the node management capacity of a single system management server, then a further system management server is needed.

In a computer system with a plurality of system management servers, each system management server may perform a system management application that manages a plurality of nodes and establishes communication with other instances of the system management application on each of the other system management servers within the computer system. The system management servers may exchange information including their own identity and node management capacity, as well as information about the nodes of the computer system. For example, each system management server may share a list of the nodes in the computer system that are known to the system management server. Optionally, each system management server may exchange information about nodes that are already being managed by the system management server. Each system management server may then compile a master list of nodes. The scope of the node information that is exchanged may further include a value of one or more node operating factor, such as a hardware configuration (such as a hardware type, hardware capacity, etc.), a software configuration (such as an identity of an installed operating system or hypervisor, etc.), a user attribute (such as the identity of a user or department), a workload type or a physical location (such as a location derived from customer tagging or network connectivity information). It should be recognized that the "value" of each node operating factor may be either quantitative or qualitative. For example, a hardware capacity may be quantitative, wherein a hardware type may qualitative.

In some embodiments, the node operating factors that are exchanged or shared may be a fixed or variable set of factors. For example, a product developer of system administrator/owner may establish a fixed set of node operating factors that will be exchanged or otherwise obtained. Alternatively, the system management servers may negotiate a set of node operating factors or make a request for certain node operating factors, perhaps based upon those node operating factors that may be used to divide the nodes into groups. The node operating factors may also change over time with changes in the number and types of nodes in the computer system, changes in the number of system management servers, or other changes in the system configuration or operation.

Once information about the system management servers and nodes has been obtained, the plurality of nodes are divided into groups, wherein each of the nodes in a group has the same value of the one or more node operating factors. In some embodiments, the plurality of nodes may be divided into groups by one or more of the system management servers. Where two or more system management servers divide the nodes into groups, the same information may be used and the same rules may be applied so that each system management server arrives at the same groups of nodes.

After dividing the plurality of nodes into groups, each one of the groups of nodes is assigned to one of the system management servers, wherein a sum of the nodes assigned to each system management server does not exceed the node management capacity of the system management server. By assigning entire groups of nodes to the system management servers as groups (rather than separately assigning each individual node), the operations improve the efficiency of subsequent node management. More specifically, since all of the nodes within a group have the same value of one or more node operating factors, the management tasks for each node in the group may be the same or similar tasks such that the system management server gains efficiency by performing the same or similar management tasks on multiple nodes through a given system management server. For example, it is more efficient to login to a single system management server and download/update the same version of BIOS firmware on three servers, than to login to three separate system management servers and perform three separate downloads and updates of the BIOS firmware on individual servers managed by the separate system management servers. However, each node may be managed by any one of the system management servers without any difference in the node's performance.

The term "sum" refers to a total number of something, whether from a single source or multiple sources. In the context of nodes assigned to each system management server, the sum of the nodes assigned to each system management server is the total number of nodes that are assigned to each system management server, regardless of whether or not there are multiple groups of nodes assigned to the system management server. For the sole purpose of an example, assume that a Group A had three nodes and a Group B had four nodes. If only Group A was assigned to a particular system management server, then the sum of nodes assigned to the system management server would be three nodes. If only Group B was assigned to a particular system management server, then the sum of nodes assigned to the system management server would be four nodes. Furthermore, if both Group A and Group B were assigned to a particular system management server, then the sum of nodes assigned to the system management server would be seven nodes.

Embodiments may divide the plurality of nodes into groups with awareness of the node management capacity of each system management server. Embodiments may make use of the fewest possible number of system management servers that have a cumulative node management capacity sufficient to manage all of the plurality of nodes. Accordingly, the computer system will not have any excess system management servers, yet none of the system management servers need to be over-capacity. Node management capacity may be stated in terms of a nominal or rated capacity, rather than a load under which the system management server will actually fail. A computer system includes the fewest number of system management servers that can manage the plurality of nodes in the computer system if a sum of the node management capacities of all of the plurality of system management servers is greater than the sum of the plurality of nodes to be managed, yet the sum of the node management capacities of one fewer than all of the plurality of system management servers would be less than the sum of the plurality of nodes. In other words, each of the system management servers is necessary and none of the system management server may be removed in order to manage all of the plurality of nodes.

In some embodiments, the plurality of nodes may be divided into groups that have the same value of one or more node operating factors, wherein the number of node operating factors that are used to determine groups of nodes may vary. In particular, the number of node operating factors used to divide the plurality of nodes into groups may vary for the purpose of arriving at a plurality of groups that can all be assigned to the available system management servers without exceeding the node management capacity of any of the available system management servers. For example, if the only node operating factor used to divide the plurality nodes into groups is the user attribute of corporate department, and the computer system only supports the accounting department and the marketing department, then dividing the plurality of nodes using the single node operating factor of corporate department will result in two groups of nodes. Each of the nodes within a group has the same value of the corporate department node operating factor as the other nodes within the same group. However, if the only node operating factor used to divide the plurality nodes into groups is the hardware type, and there are three different hardware types in the computer system, then dividing the plurality of nodes using the single node operating factor of hardware type will result in three groups of nodes. Again, each of the nodes within a group has the same value of the hardware type as the other nodes with the same group. If the groups of nodes formed using a single node operating factor can be assigned to the available system management servers without exceeding the node management capacity of any of the available system management servers, then it is an option to perform no further division of the groups of nodes. Still, some embodiments may use one or more further node operating factor(s) to divide the nodes into a larger number of smaller groups of nodes either to avoid exceeding the node management capacity of a system management server or to improve the balance of nodes across the available system management servers.

In some embodiments, the plurality of nodes may be divided into groups that have the same value of one or more node operating factors, wherein the number of node operating factors that are used to determine groups of nodes may be two or more node operating factors. When two or more node operating factors are used to divide the nodes into groups, each of the nodes in a given group will have the same value of each of the two or more node operating factors. If a first of two node operating factors has two possible values (for example, A and B) and the second of two node operating factors has three possible values (for example, 1, 2 and 3), then using these two node operating factors to divide the nodes into groups may result in up to six groups (for example, A1, A2, A3, B1, B2 and B3). Using the foregoing notation, each node in a first group has both an "A" value of the first node operating factor and a "1" value for the second node operating factor. Similarly, each node in a second group have both an "A" value of the first node operating factor and a "2" value for the second node operating factor. Each node in each of the remaining third through sixth groups have the same values of the first and second node operating factors as indicated in their names A3, B1, B2 and B3, respectively. In some embodiments, a number of node operating factors that are used to divide the plurality of nodes into groups may be increased until each of the groups of nodes can be assigned to one of the system management servers.

In some embodiments, the operations may further include selecting a first of the two or more node operating factors as a primary node operating factor and a second of the two or more node operating factors as a secondary node operating factor. Accordingly, the operation of assigning each one of the groups of nodes to one of the system management servers may include assigning the groups of nodes having the same value of the primary node operating factor to a particular one of the system management servers until either the groups of nodes having the same value of the primary node operating factor have all been assigned or there is an insufficient remaining amount of the node management capacity on the particular system management server to manage a further one of the groups of nodes having the same value of the primary node operating factor. If there is an insufficient remaining amount of the node management capacity on the particular system management server to manage a further one of the groups of nodes having the same value of the primary node operating factor, then additional groups of nodes having the same value of the primary node operating factor may be assigned to a different one of the system management servers. In some embodiments, the primary and secondary node operating factors may be selected through manual user input or may be selected automatically by one or more of the system management servers. In one non-limiting example, a primary node operating factor may be selected by a first one of the system management servers and a secondary node operating factor may be selected by a second one of the system management servers. The system management servers in the computer system each share the node operating factors that will be used to divide the nodes into groups (i.e., a "grouping factor") with the other system management servers in the computer system. Accordingly, each system management server may collect a set of grouping factors for the computer system, including the grouping factor(s) of each system management server, and use the set of grouping factors to determine groups of nodes to be managed by each system management server.

In some embodiments, the nodes are divided into groups in a manner that leads to a greater balance of the management load among the system management servers. Balance may be measured by the number of nodes under management by each system management server. For example, two system management servers that each manage 90 nodes may be considered to be balanced. However, in computer systems having system management servers with different node management capacities, it may be more useful to measure balance in terms of a percentage of node management capacity for each system management server. For example, if a first system management server has a node management capacity of 100 nodes and a second system management server has a node management capacity of 150, then the first and second system management servers may be considered to be balanced if they both manage 80% of their node management capacity (i.e., 80 nodes and 120 nodes, respectively).

In some embodiments, after assigning each one of the groups of nodes to one of the system management servers, the operations may further include determining whether there is greater than a predetermined difference in an amount of nodes assigned to any of the system management servers and an amount of nodes assigned to any other of the system management servers. An amount of nodes may be a specific number of nodes or a percentage of the node management capacity of a particular system management server. The operations may further include increasing a number of node operating factors that are used to divide the plurality of nodes into groups until each of the groups of nodes can be assigned to one of the system management servers so that there is less than a predetermined difference in an amount of nodes assigned to any of the system management servers and an amount of nodes assigned to any other of the system management servers.

In some embodiments, the system management servers may store a list of the nodes assigned to at least one of the groups and a network address for each node in the at least one of the groups. For example, each system management server may maintain a list of the nodes that are under management by the system management server. Alternatively, each system management server may maintain a list of all of the nodes within the computer system regardless of which system management server is currently managing the nodes. Such list of nodes may further include various specifications about each node, such as the various hardware, firmware and software that are part of the node. Each system management server may share a list of its nodes with one or more of the peer system management servers to facilitate determinations about which nodes should be managed by which system management server.

A given system management server and the set of nodes under management by the given system management server may be referred to as a "management domain." For example, each system management server may store the network address of each node under its management, where the management domain includes those nodes under its management. Alternatively, each management domain may be defined using a virtual local area network (VLAN), where the nodes assigned to a given management domain are made to be members of the VLAN.

The topology of the computer system can be any known topology without limitation. Furthermore, the nodes do not have to be located on a single physical network since each management server can manage nodes installed in multiple physical sites or on multiple physical networks via a network connection to each of the sites or networks.

In operation, the system management servers may each manage a group of nodes that are assigned to the system management server. Management of a node may include monitoring operation of the node, responding to errors or performance issues, updating firmware, and handling of other management issues. Management communications between a system management server and an individual node may be transmitted over a network and may include in-band communications with an operating system of the node, out-of-band communications with a service processor of the node, or some combination.

Each system management server may manage the nodes assigned to a given management domain. Accordingly, when management responsibility for a particular node is transferred from a source system management server to a destination system management server, the particular node becomes a member of the management domain associated with the destination system management server. This transfer is a logical transfer that does not require relocation or reconnection of the node. Some embodiments may include transferring a node from a first one of the group of nodes, which is assigned to a first one of the system management servers, to a second one of the group of nodes, which is assigned to a second one of the system management servers. Management credentials for the transferred node may also be transferred from the first system management server to the second system management server.

During operation of the computer system, a new node may be introduced into the computer system. A default system management server may initially assume management of the new node, but ultimately one or more of the system management servers may propose or request management of the new node. The new node may be subsequently transferred to a different management domain that is managed by a different system management server if it is determined that such transfer would improve the node management. In the event of a transfer of management responsibility for a node, the default or other source system management server may remove the transferred node from its list of managed nodes and the destination system management server may add the transferred node to its list of managed nodes. Some embodiments may include detecting the presence of a new node in the computer system, assigning the new node to the first one of the groups of nodes in response to determining that the new node has a value of the one or more node operating factor that is the same as the value of the one or more node operating factor of a first one of the groups of nodes, and managing the new node with a first one of the system management servers to which the first one of the groups of nodes has been assigned.

In some embodiments, the information collection, group formation, group assignment, node transfer and node management may be entirely automated. In some embodiments, the system management applications may determine which of the nodes should be managed by which of the system management applications, then wait for confirmation or authorization from a system administrator before actually transferring any of the nodes between management domains.

In some embodiments, the division of the nodes into groups and the assignment of those groups of nodes to particular system management servers may be performed using a rules engine. Optionally, the rules engine may recommend multiple potential configurations from which an administrator may selected a final configuration. In some embodiments, the rules engine may enforce a rule that the nodes should be managed with the fewest number of system management servers. In some embodiments, the rules engine may enforce a rule that the nodes be grouped, to the greatest extent possible consistent with other rules, according to a designated preference or ranking (i.e., primary, secondary, etc.) of node operating factors. Other rules may be entered or selected from a menu of predetermined rules.

Embodiments of the system and method may provide logical and usability improvements. For example, a computer system with multiple management servers that organize the managed nodes into multiple management domains may subsequently allow a system administrator to perform a management operation on a group of similar nodes through access to a single system management server, rather than having to access each of the multiple system management servers to perform the management operation on a subgroup of the similar nodes. A firmware update or software configuration change may be needed on a group of nodes that share a common mission or that are of a common type. If each of the nodes in the group are already partitioned into a given management domain that matches the maintenance responsibility set of the administrative personnel, then the firmware update or software configuration change may be accomplished through the system management server of the given management domain. In one specific example, a system administrator A may only need to access a system management server A to manage all of the nodes for an accounting department, and a system administrator B may only need to access system management server B to manage all of the nodes for a marketing department.

A large organization or entity may have multiple system administration personnel and a computer system with multiple system management servers. Each system administrator may be responsible for the computer services of a specific group or department of the organization and may have their own unique credentials for managing the nodes under their responsibility. Accordingly, each system management server may maintain a specific set of credentials for each of the nodes within the management domain of the system management server. However, if the nodes associated with a given department are grouped into a given management domain, then there will be greater isolation of the hardware used by the given department and greater protection against accidental or intentional interference from the system administrator of another department or organization. Specifically, credentials for the accounting department system administrator may be transferred along with an accounting node to an accounting management domain and the credentials for the marketing department system administrator may be transferred along with a marketing node to a marketing management domain. It follows that the credentials for the accounting department system administrator may be isolated on the system management server for the accounting department management domain and the credentials for the marketing department system administrator may be isolated on the system management server for the marketing department management domain.

A management domain may be defined as the set of nodes under management of a given system management server. All of the nodes in the computer system are assumed to be manageable by any of the available system management server instances, but each node may be assigned to a single management domain managed by a single system management server. The nodes may become informed of the network address of the system management server that is managing them based upon the network traffic that the node receives from the system management server. However, the nodes may be responsive to any of the system management servers. In some embodiments, a virtual local area network (VLAN) may be used to facilitate communication between a system management server and each node with the management domain of the given system management server. Alternatively, each system management server may keep a list that includes the Media Access Control (MAC) or Internal Protocol (IP) address for each node within its management domain.

In situations where a given system management server has reached its management capacity, new or additional nodes may not be assigned to the given system management server. If a number of nodes in a group exceeds the management capacity of a single system management server, the nodes may be spread across the fewest possible number of system management servers by first dividing the nodes into smaller groups. In some embodiments, a secondary node operating factor may be used to further divide the oversized group into multiple smaller groups. For example, if a primary node operating factor used for grouping nodes is the user attribute of a company department, but the accounting department has a number of nodes that exceeds the management capacity of a single system management server, then a secondary node operating factor of hardware type may be used to identify a first group of storage chassis for the accounting department to be managed by one system management server and a second group of servers for the accounting department to be managed by another system management server. By using additional node operating factors to divide the nodes into smaller groups, the nodes within a group are not spread across two management domains.

A simple example of grouping nodes involves a given number of system management servers, a grouping criteria (i.e., the one or more node operating factors used to divide the nodes into groups) that produces an equal number of groups, and a balanced number of nodes belonging to each group. In a specific instance, two system management servers that each have a node management capacity of 100 nodes may manage 120 nodes, where 60 nodes are used by a corporate accounting department and 60 nodes are used by a corporate marketing department. If the grouping criteria is the user attribute of corporate department, then one system management server may manage the 60 nodes of the accounting department and the other system management server may manage the 60 nodes of the marketing department. As a result, each system management server has an equal number of nodes to manage and management of the nodes is simplified since all of the nodes for a given department are accessible through a single one of the system management servers.

However, many computer systems are not so easily divided into balanced groupings using the fewest number of system management servers necessary to manage every node in the computer system. When grouping nodes using a single node operating factor results in a group that exceeds the node management capacity of a system management server or results in an unacceptable imbalance of nodes between the fewest necessary number of system management servers, the nodes may be grouped using a second node operating factor along with the first node operating factor to further divide the nodes into smaller groups. For example, when the number of nodes in one of the groups exceeds the capacity of a given system management server, a secondary grouping factor may also be applied to form multiple smaller groups. One or more of the groups may remain in the management domain of the given system management server and one or more of the groups may be assigned to a management domain of another system management server. Optionally, if the groups formed using two node operating factors are still of such a size that they cannot be divided among the fewest number of system management servers, embodiments may use additional node operating factors until there is some level of grouping that allows the groups to be assigned among the fewest number of system management servers.

In order to keep the number of system management servers to the fewest number necessary to manage the totality of nodes in the computer system, the grouping criteria may include any number of node operating factors to divide the nodes into groups that are small enough to prevent any of the system management servers from being "oversubscribed" or "over-capacity" (i.e., managing a number of nodes that exceeds its nominal node management capacity). While there may be some detriments to dividing up the nodes into a large number of small groups, doing so may be necessary to satisfy the rule of using the fewest number of system management servers. Furthermore, when it becomes necessary to divide up the nodes into a greater number of groups, the nodes within a group still have multiple node operating factors in common, such that management of the nodes in the group by another system management server is simplified to greatest extent possible.

For example, if the node management capacity of each system management server is 80 nodes and a computer system has a total of 140 nodes, then the fewest necessary number of system management servers is two system management servers (2×80>140). If the node operating factor used to divide the nodes into groups is the user attribute of corporate department and if there is only an accounting department and a marketing department, then it might be the case that the single node operating factor (i.e., corporate department) would be sufficient to group the nodes so that neither system management server is over-capacity. However, if the accounting department uses 100 nodes and the marketing department uses just 40 nodes, then a secondary node operating factor may be used to divide the "over-capacity" accounting department nodes into two groups. If the secondary node operating factor is the hardware type and the 100 nodes of the accounting department included 80 servers and 2 multi-node chassis, where each multi-node chassis includes 10 blade servers, then the 100 nodes of the accounting department group may be divided into a first group of 80 accounting stand-alone servers and a second group of 20 accounting blade servers. Placing the group of 20 accounting blade servers (i.e., the 2 multi-node chassis) in the same management domain with the 40 marketing nodes will result one system management domain with 60 total nodes (i.e., all 40 nodes of the marketing department and all of the 20 blade servers of the accounting department) and another system management domain with 80 total nodes (i.e., all of the 80 stand-alone servers of the accounting department). As a result, the fewest number of system management servers are used and each of the system management servers manage a number of nodes that is within their nominal node management capacity. Furthermore, since it is unavoidable to divide up the accounting department's nodes across two system management servers in this example, keeping the 20 accounting blade servers together may serve to simplify management of those 20 blade servers to the greatest extent possible. For example, when the administrator for the accounting department wants to deploy a firmware update to the 20 blade servers or the 2 multi-node chassis that support the blade server, it is possible to implement that firmware update from a single system management server.

Furthermore, forming groups using multiple node operating factors may be desirable in order to improve the balance of nodes being managed by each system management server in a given computer system even if the fewest number of system management servers are being used and none of the system management servers are over-capacity. For example, if the management capacity of each system management server is 80 nodes and a computer system has a total of 120 nodes, then the fewest necessary number of system management servers is two. If the single node operating factor used to divide the nodes into groups is the user attribute of corporate department, and if the accounting department uses 80 nodes and the marketing department uses 40 nodes, then the single node operating factor is sufficient to divide the 120 nodes into two management domains where neither management domain exceeds the management capacity of the respective system management server. Optionally, this could be the final grouping of the nodes.

However, some embodiments may go further to use a second node operating factor in order to achieve greater balance between the two management domains. Using only the single factor leads to one system management server operating at 100% of its management capacity while the other system management server operates at only 50%. If a second node operating factor of hardware type is used to group the nodes, and the 80 nodes of the accounting department included 60 stand-alone servers and 2 multi-node chassis, where each multi-node chassis includes 10 blade servers, then the 80 nodes of the accounting department group may be divided into a first group of 60 accounting stand-alone servers and a second group of the 20 accounting blade servers. Placing the group of 20 accounting blade servers (i.e., the 2 multi-node chassis) in the same management domain with the 40 nodes of the marketing department, will result in one system management domain with 60 total nodes (i.e., all 40 nodes of the marketing department and all of the 20 blade servers of the accounting department) and another system management domain with 60 total nodes (i.e., all of the 60 accounting stand-alone servers of the accounting department). As a result, the fewest number of system management servers are used, each of the system management servers manage a number of nodes that is within their nominal management capacity, and the balance of nodes managed by each system management server has been improved. Specifically, after using two node operating factors to divide the nodes into groups, each system management server now operates at 75% of its management capacity. While it was discretionary to divide up the accounting department's nodes across two system management servers, the settings or configuration of the system management application on each system management server may indicate that the system administrator prefers to balance the management domains to avoid greater than a given percentage difference (i.e., 10%) in the number of managed node.

In some embodiments, a system management application may determine, or a system administrator may designate, a ranking of multiple grouping factors (i.e., two or more node operating factors used to divide nodes into groups). Where the system management application makes such determination, the multiple grouping factors may be ranked in a manner that leads to the use of the fewest grouping factors to arrive at groups that do not exceed the management capacity of the fewest necessary number of system management servers. For example, if grouping the nodes by the user attribute of corporate department leads to an accounting department group of nodes that does not exceed the management capacity of a first system management server and a marketing department group of nodes that also does not exceed the management capacity of a second system management serve, then this user attribute may be selected as the primary grouping factor without need for a secondary grouping factor. However, in a situation where grouping the nodes by corporate department leads to an "over-capacity" group, the system management application may selected hardware type as the primary grouping factor if doing so leads to no "over-capacity" group. In still further situations, the system management application may determine that multiple grouping factors lead to more optimal groups of nodes.

Where the system management application ranks or selects the grouping factors, the grouping factors may alternatively be ranked or selected in a manner that leads to the greatest balance between the management domains. For example, if grouping the nodes by the user attribute of corporate department leads to 50% of the nodes in each management domain, then this user attribute may be selected as the only grouping factor without need for a second grouping factor. However, if grouping the nodes by corporate department causes the two management domains to reach 90% of management capacity and 70% of management capacity, respectively, then the management application may determine to use hardware type as the grouping factor if doing so leads to greater balance in the management capacity of the two system management servers. In still further situations, the system management application may determine that multiple grouping factors lead to a more optimal grouping of nodes between the management domains.

Another embodiment provides an apparatus comprising at least one non-volatile storage device storing program instructions and at least one processor configured to process the program instructions, wherein the program instructions are configured to, when processed by the at least one processor, cause the apparatus to perform operations. The operations comprise identifying a plurality of system management servers in a computer system and a node management capacity for each system management server, identifying a plurality of nodes in the computer system and a value of one or more node operating factors for each node, and dividing the plurality of nodes into groups, wherein each of the nodes in a group has the same value of the one or more node operating factors. The operations further comprise assigning each one of the groups of nodes to one of the system management servers, wherein a sum of the nodes assigned to each system management server does not exceed the node management capacity of the system management server, and managing, for each system management server, the group of nodes that are assigned to the system management server.

The foregoing apparatus may further perform any of the operations described in reference to embodiments of a computer program product. Accordingly, a separate description of the operations will not be duplicated in the context of an apparatus.

FIG. 1A is a diagram of a computer system 10 including three system management servers 12 that each manage a plurality of nodes 14. Each system management server 12 and each node 14 may be connected to a network 16 that enables communication among the system management servers 12 and between any system management server 12 and any node 14. These entities may communicate by any means, such as an Ethernet connection, in order to perform some of the disclosed embodiments.

Each of the system management servers 12 may run a system management application (not shown). As shown, each of the system management servers 12 manages a certain group of nodes 14 according to some default or legacy relationships, assignments or connections. In this Example, System Management Server 1 manages the Managed Chassis (Storage) and Managed Server that are illustrated just below the System Management Server 1 with no cross-hatching, System Management Server 2 manages the Managed Chassis (Compute), Managed Chassis (Storage) and Managed Server that are illustrated just below the System Management Server 2 with cross-hatching (upward to the right), and System Management Server 3 manages the Managed Chassis (Compute), Managed Chassis (Storage) and two Managed Servers that are illustrated just below the System Management Server 3 with cross-hatching (downward to the right).

Figure 1B:
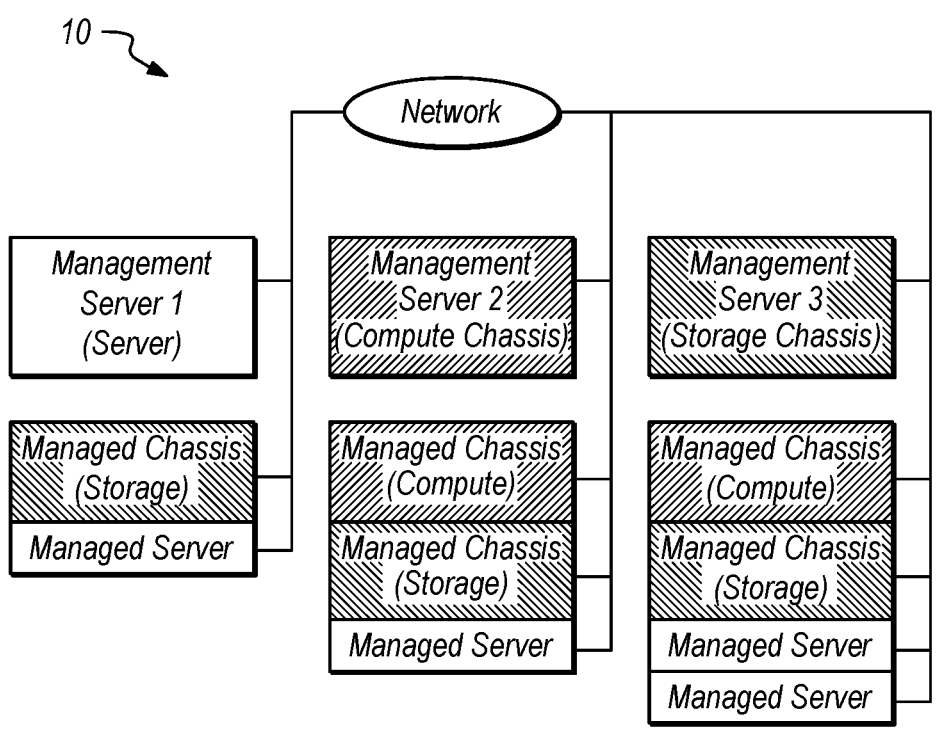
FIG. 1B is a diagram of the computer system of FIG. 1A after dividing the nodes in groups based on hardware type and assigning those groups of nodes to the three management servers.

FIG. 1B is a diagram of the computer system 10 of FIG. 1A, including the same three system management servers 12. However, FIG. 1B has divided the nodes 14 into groups using a node operating factor that is the hardware type. Namely, in the illustrated computer system 10, there are just three types of hardware illustrated although there is no limit on the number of hardware types. A first group that includes all of the Managed Servers is illustrated with no cross-hatching and is assigned to the Management Server 1, a second group that includes all of the Managed Chassis (Compute) is illustrated with cross-hatching (upward to the right) and is assigned to the Management Server 2, and a third group that includes all of the Managed Chassis (Storage) is illustrated with cross-hatching (downward to the right) and is assigned to the Management Server 3. It should be noted that none of the nodes 14 were moved from their original location as shown in in FIG. 1A. Rather, the assignment of a group of nodes to a system management server is a logical assignment that indicates that a particular system management server is responsible for that group of nodes.

Figure 2:
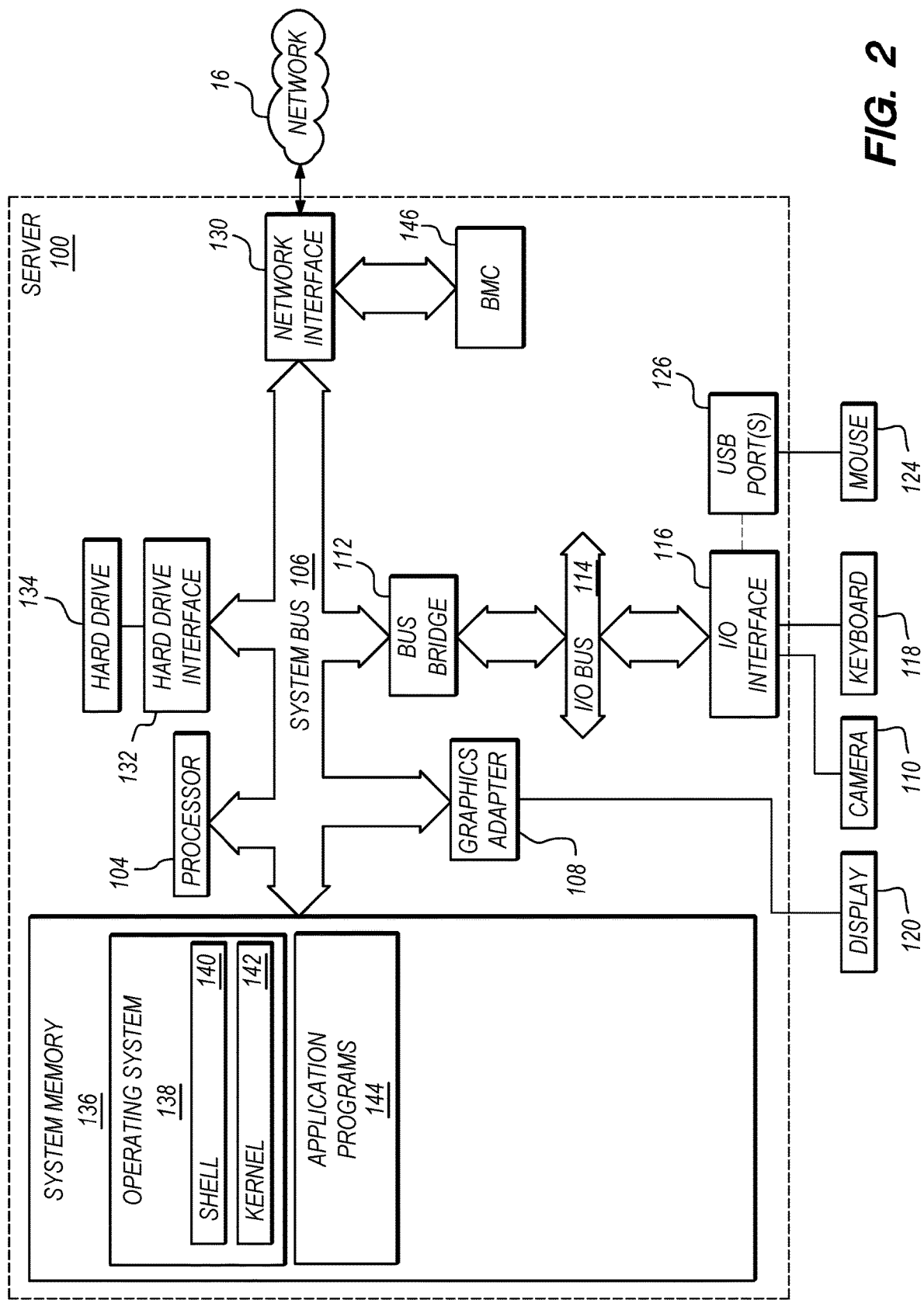
FIG. 2 is a diagram of a server.

FIG. 2 is a diagram of one embodiment of a server 100 that may be representative of the configuration of any of the system management servers 12 of FIGS. 1A and 1B, but may also be representative of the configuration of a managed server. The server 100 includes a processor unit 104 that is coupled to a system bus 106. The processor unit 104 may utilize one or more processors, each of which has one or more processor cores. A graphics adapter 108, which drives/supports the display 120, is also coupled to system bus 106. The graphics adapter 108 may, for example, include a graphics processing unit (GPU). The system bus 106 is coupled via a bus bridge 112 to an input/output (I/O) bus 114. An I/O interface 116 is coupled to the I/O bus 114. The I/O interface 116 affords communication with various I/O devices, including a camera 110, a keyboard 118 (such as a touch screen virtual keyboard), and a USB mouse 124 via USB port(s) 126 (or other type of pointing device, such as a trackpad). As depicted, the server 100 is able to communicate with other network devices over the network 16 using a network adapter or network interface controller 130. For example, the server 100 may communicate with other system management servers 12 and other nodes 14 is the system 10 of FIGS. 1A and 1B.

A hard drive interface 132 is also coupled to the system bus 106. The hard drive interface 132 interfaces with a hard drive 134. In a preferred embodiment, the hard drive 134 communicates with system memory 136, which is also coupled to the system bus 106. System memory is defined as a lowest level of volatile memory in the computer 100. This volatile memory may include additional higher levels of volatile memory (not shown), including, but not limited to, cache memory, registers and buffers. Data that populates the system memory 136 may include an operating system (OS) 138 and application programs 144. Embodiments may include an application program that is a system management application including program instructions that cause the processor 104 to perform various operations.

The hardware elements depicted in the server 100 are not intended to be exhaustive, but rather are representative. For instance, the server 100 may include non-volatile memory and the like.

The operating system 138 includes a shell 140 for providing transparent user access to resources such as application programs 144. Generally, the shell 140 is a program that provides an interpreter and an interface between the user and the operating system. More specifically, the shell 140 executes commands that are entered into a command line user interface or from a file. Thus, the shell 140, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 142) for processing. Note that while the shell 140 may be a text-based, line-oriented user interface, embodiments may support other user interface modes, such as graphical, voice, gestural, etc.

As depicted, the operating system 138 also includes the kernel 142, which may include lower levels of functionality for the operating system 138, including providing essential services required by other parts of the operating system 138 and application programs 144. Such essential services may include memory management, process and task management, disk management, and mouse and keyboard management. As shown, the server 100 includes application programs 144 in the system memory of the server 100, including, without limitation, a system management application.

In some embodiments, the server 100 may be representative of the hardware configuration of a managed server. A managed server may further include a service processor, such as a baseboard management controller (BMC) 146. The BMC may be used to perform out-of-band processing and may monitor and manage various features of the hardware components of the server. For example, the BMC may handle firmware updates to various components of the server. A system management server may communicate with the BMC of a managed server for the purpose of managing the managed server.

FIGS. 3A-D are a series of graphs illustrating the management load on each of two system management servers. In each graph, the management load is indicated along a vertical axis and is measured in a number of nodes. Two bars are located along the longitudinal axis to represent the load on Management Server 1 and Management Server 2, wherein the height of the bar indicates the number of node assigned to the individual system management server. Furthermore, a dashed horizontal line intersects the vertical axis to illustrate the node management capacity of each system management server. In the present graphs, each system management server has the same node management capacity, but embodiments may include system management server having different node management capacities.

Figure 3A:
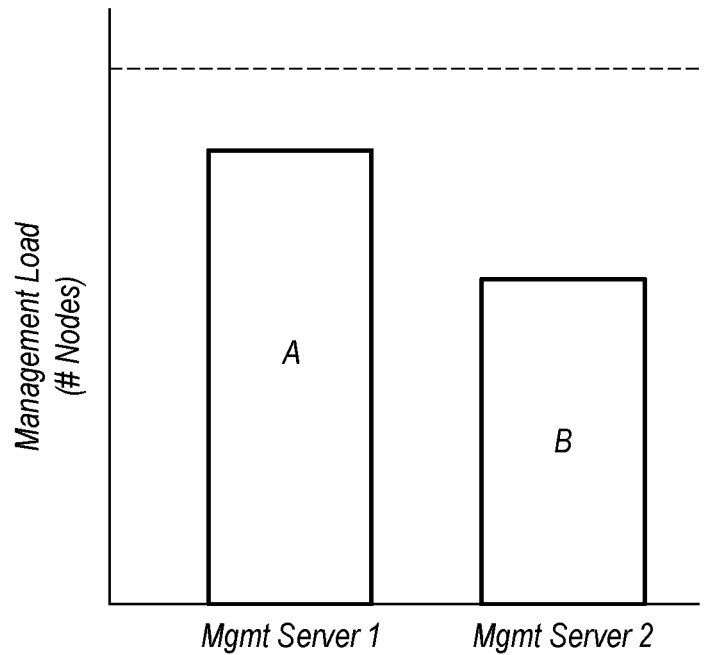
FIGS. 3A-3D are a series of graphs illustrating the management load on each of two system management servers in different situations and stages.

In FIG. 3A, the nodes of a computer system have been divided using a single node operating factor, such as the user attribute of corporate department. A group of nodes having a value of A for the node operating factor has been assigned to Management Server 1 and a group of nodes having a value of B for the node operating factor has been assigned to Management Server 2. Neither group exceeds the nominal node management capacity of their respective system management servers, so groups of nodes may be managed as illustrated.

Figure 3B:
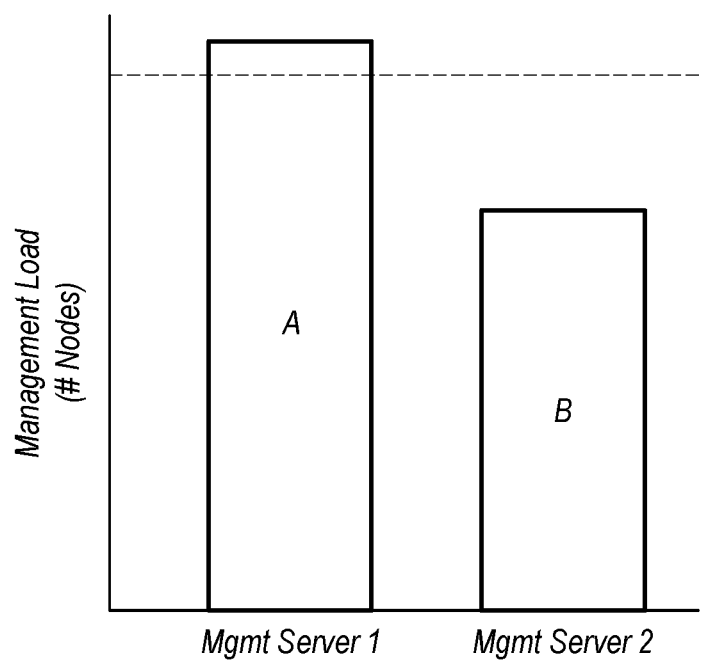

In FIG. 3B, the nodes of a computer system have been divided using the same single node operating factor as in FIG. 3A. A group of nodes having a value of A for the node operating factor has been assigned to Management Server 1 and a group of nodes having a value of B for the node operating factor has been assigned to Management Server 2. However, the group of nodes having the value of A for the node operating factor exceeds the nominal node management capacity (i.e., the bar height extends above the dashed line) of Management Server 1. Accordingly, the two groups may not be managed as illustrated.

Figure 3C:
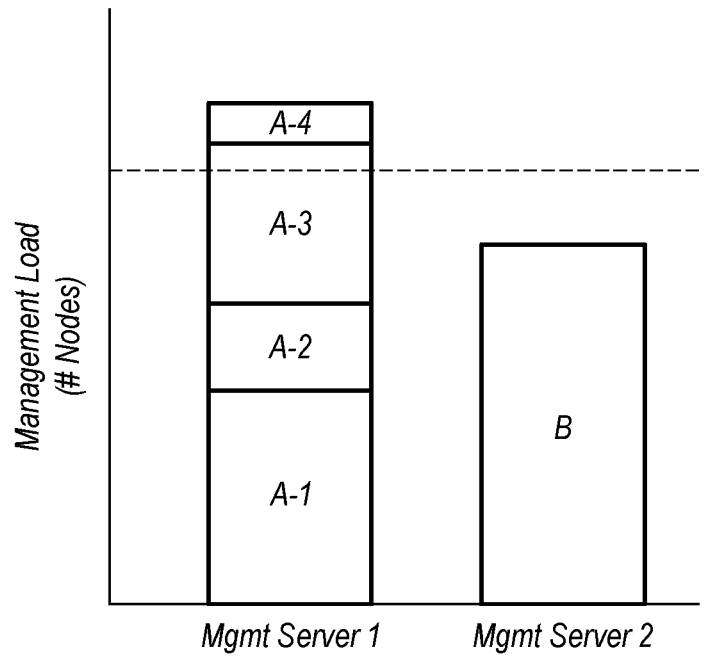

In FIG. 3C, the nodes of the computer system as illustrated in FIG. 3B have been divided into groups using two node operating factors, such as the user attribute of corporate department (either value A or B) and a hardware type (either value 1, 2, 3 or 4). As illustrated, the corporate department A has all four hardware types, resulting in four groups of nodes, where the nodes within each group have the same corporate department value and the same hardware type value. While group B could also be divided further by also using the second node operating factor of hardware type, the number of nodes in group B do not exceed the node management capacity of Management Server 2 such that each of the group B nodes may be managed by the same system management server.

With the node of the corporate department A divided into four groups A1, A2, A3 and A4, the system management server identifies whether one or more of the groups can be assigned to the Management Server 2 (i.e., transferred from Management Server 1 to Management Server 2) so that neither system management server is over-capacity.

Figure 3D:
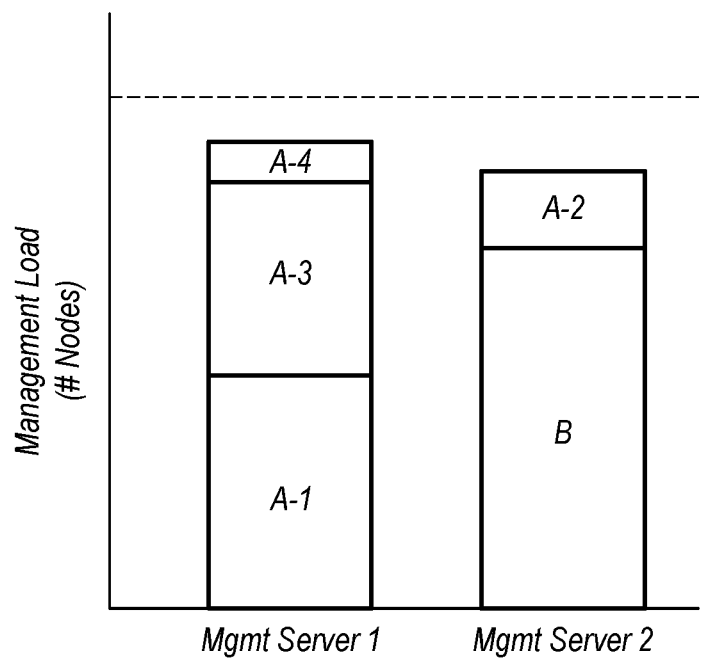

In FIG. 3D, the group A2 nodes have been assigned to Management Server 2 to be managed along with the group B nodes without exceeding the node management capacity of Management Server 2. In addition, the groups A1, A3 and A4 are assigned to Management Server 1 to be managed without exceeding the node management capacity of Management Server 1. As a result, the groups of nodes shown in FIG. 3D may be managed as illustrated.

It should also be appreciated that the balancing of nodes illustrated in the services of FIGS. 3A through 3D may be performed regardless of whether or not the number of nodes in either group A or group B exceed the node management capacity of their respective system management servers. Rather, embodiments may improve the balance of nodes for the purpose of balancing the workload on the system management servers.

Figure 4A:
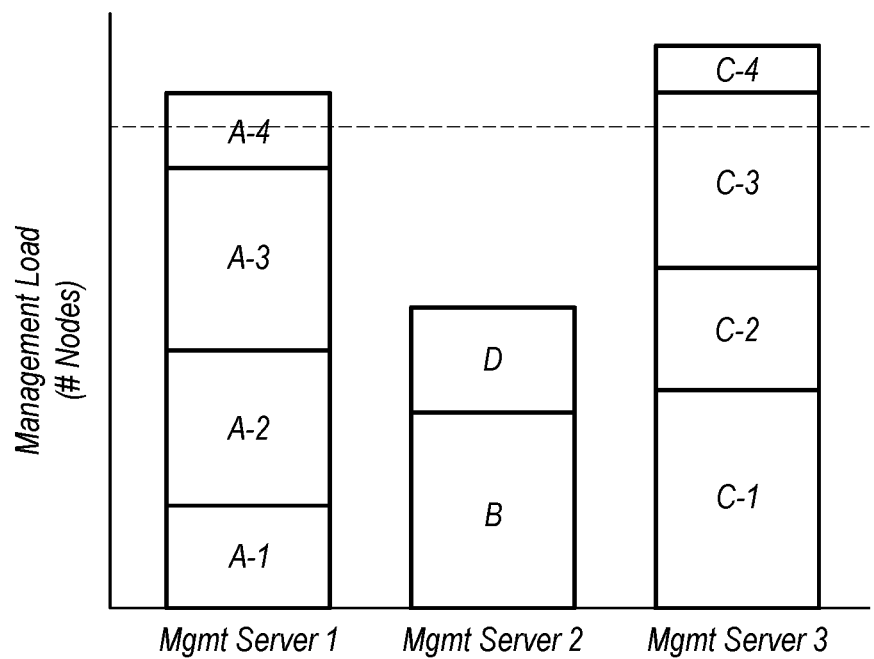
FIGS. 4A-B are two graphs illustrating the management load on each of three system management servers.
Figure 4B:
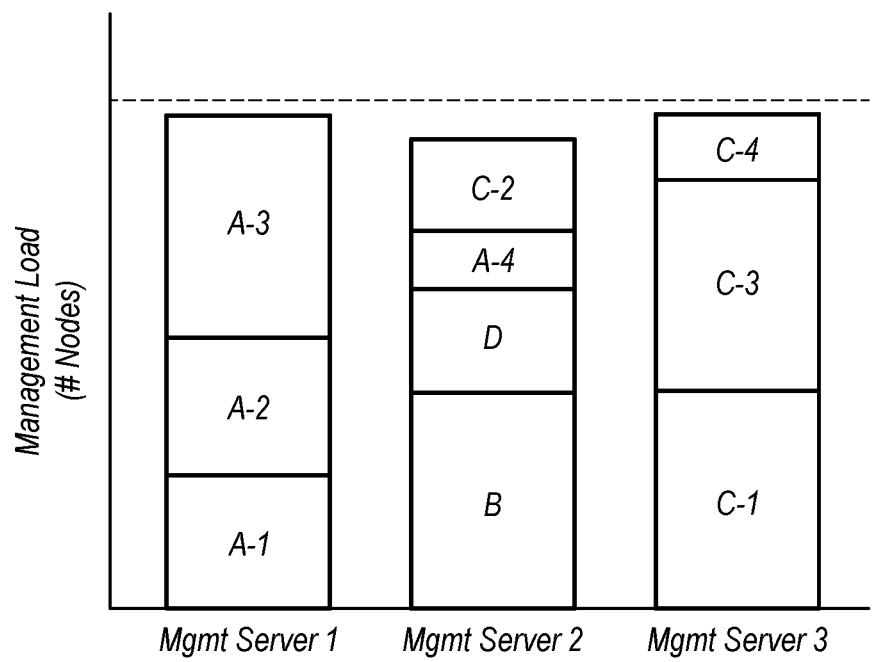

FIGS. 4A-B are two graphs illustrating the management load on each of three system management servers. In FIG. 4A, the nodes of the computer system are divided using two node operating factors, where the nodes have values of A, B, C and D for the first node operating factor and have values of 1, 2, 3 and 4 for the second node operating factor. In this example, three system management nodes are the fewest number of system management nodes that have sufficient cumulative node management capacity to manage all of the nodes in the computer system. The number of nodes in both group A and group C exceed the node management capacity of a system management server, whereas all of the nodes in group B and Group D are assigned to the same Management Server 2 without exceeding the node management capacity. So, FIG. 4A shows that merely using a single (first) node operating factor does not result in groups that can assigned to the system management servers without exceeding the node management capacity. So, a further (second) node operating factor is used to further divide the nodes into smaller groups. Again, since the number of nodes in group B and group D do not exceed the node management capacity of a system management server, there is no need to apply the second node operating factor to further divide those nodes into smaller groups. However, in some instances, it may be necessary or helpful to always divide the nodes into groups using the same node operating factors. In FIG. 4B, it has been determined that assigning groups A4 and C2 to Management Server 2 will result in each system management server being within its node management capacity.

Figure 5:
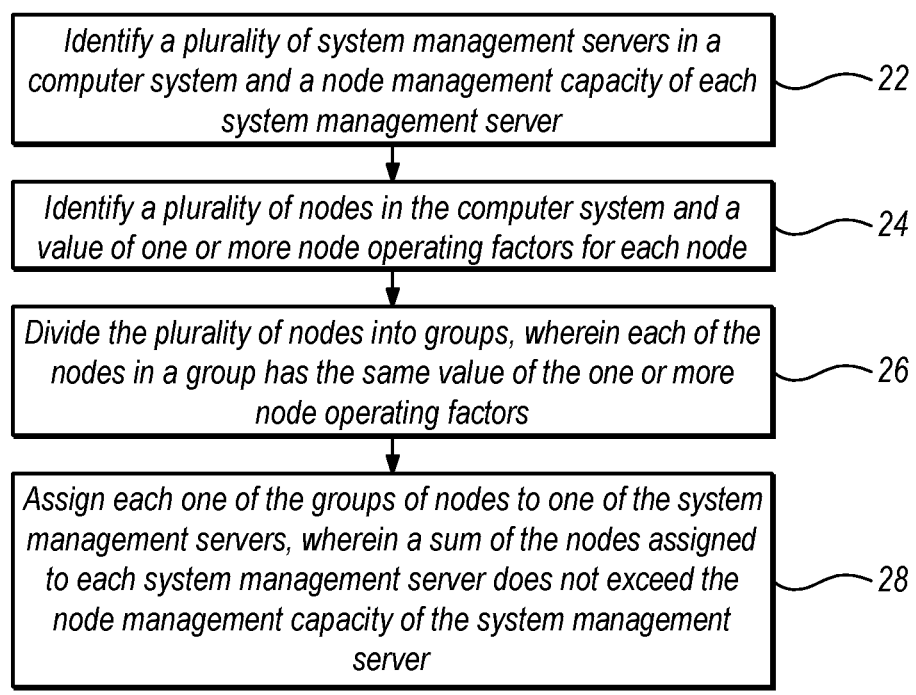
FIG. 5 is a flowchart of operations that may be performed to form groups of nodes that can be assigned to system management servers without exceeding their node management capacity and/or to improve balance of the management load.

FIG. 5 is a flowchart of operations that may be performed by some embodiments. In step 22, the operations identify a plurality of system management servers in a computer system and a node management capacity for each system management server. In step 24, the operations identify a plurality of nodes in the computer system and a value of one or more node operating factors for each node. In step 26, the operations divide the plurality of nodes into groups, wherein each of the nodes in a group has the same value of the one or more node operating factors. In step 28, the operations assign each one of the groups of nodes to one of the system management servers, wherein a sum of the nodes assigned to each system management server does not exceed the node management capacity of the system management server.

In some embodiments, the operations of step 26 may be repeated to arrive at satisfactory groups of node in an iterative manner. For example, a single node operating factor may be used to divide the nodes into groups. However, if any of the resulting groups exceed the node management capacity of a system management server, or if the groups of nodes cannot be assigned in a manner to avoid an imbalance exceeding a threshold imbalance, then an additional node operating factor may be used use further divide the nodes into smaller groups. If any of these groups would still exceed the node management capacity of a system management server, or if the groups of nodes cannot be assigned in a manner to avoid an imbalance exceeding a threshold imbalance, then the foregoing steps may be repeated for a third node operating factor and so on.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-volatile computer readable medium and non-transitory program instructions embodied therein, the program instructions being configured to be executable by a processor to perform operations comprising:
   identifying a plurality of system management servers in a computer system and a node management capacity for each system management server;
   identifying a plurality of nodes in the computer system and a value of one or more node operating factors for each node;
   dividing the plurality of nodes into groups based on the value of the one or more node operating factors;
   assigning, for each of the groups of nodes, the group of nodes to a selected one of the system management servers, wherein a sum of the nodes assigned to each system management server does not exceed the node management capacity of the system management server; and
   managing, for each system management server, each node that is in any of the groups of nodes that are assigned to the system management server.

2. The computer program product of claim 1, wherein the one or more node operating factors includes two or more node operating factors, and wherein the plurality of nodes are divided into groups based on the value of each of the two or more node operating factors.

3. The computer program product of claim 2, the operations further comprising:
   selecting a first of the two or more node operating factors as a primary node operating factor and a second of the two or more node operating factors as a secondary node operating factor, wherein assigning each one of the groups of nodes to one of the system management servers includes:
   assigning the groups of nodes based on the value of the primary node operating factor to a particular one of the system management servers until there is an insufficient remaining amount of the node management capacity on the particular system management server to manage a further one of the groups of nodes based on the value of the primary node operating factor.

4. The computer program product of claim 3, the operations further comprising:
   after there is an insufficient remaining amount of the node management capacity on the particular system management server to manage a further one of the groups of nodes based on the value of the primary node operating factor, assigning additional groups of nodes based on the value of the primary node operating factor to a different one of the system management servers.

5. The computer program product of claim 4, wherein the primary node operating factor and the secondary node operating factor are selected through user input.

6. The computer program product of claim 4, wherein the primary node operating factor is selected by a first one of the system management servers and the secondary node operating factor is selected by a second one of the system management servers.

7. The computer program product of claim 1, wherein the one or more node operating factors are selected from the group consisting of a hardware type, a software configuration, a user attribute, a workload type, geographic location and combinations thereof.

8. The computer program product of claim 7, wherein the user attribute is a user group.

9. The computer program product of claim 1, the operations further comprising:
   increasing a number of node operating factors that are used to divide the plurality of nodes into groups until each of the groups of nodes can be assigned to one of the system management servers without causing, for each of the system management servers, the sum of the nodes assigned to the system management server to exceed the node management capacity of the system management server.

10. The computer program product of claim 1, the operations further comprising:
    after assigning each one of the groups of nodes to one of the system management servers, determining whether there is greater than a predetermined difference in a number of nodes assigned to any of the system management servers and a number of nodes assigned to any other of the system management servers; and
    increasing a number of node operating factors that are used to divide the plurality of nodes into groups until each of the groups of nodes can be assigned to one of the system management servers so that there is less than a predetermined difference in a number of nodes assigned to any of the system management servers and a number of nodes assigned to any other of the system management servers.

11. The computer program product of claim 1, wherein the plurality of system management servers includes the fewest number of system management servers that can manage the plurality of nodes in the computer system.

12. The computer program product of claim 1, wherein identifying a plurality of nodes in the computer system and a value of one or more node operating factors for each node includes receiving a message from each of the other system management servers in the computer system, wherein the received message identifies, for each node currently under management by the system management server, the node and a value of the one or more node operating factors for the node.

13. The computer program product of claim 1, the operations further comprising:
    storing a list of the nodes assigned to at least one of the groups and a network address for each node in the at least one of the groups.

14. The computer program product of claim 1, wherein the group of nodes assigned to one of the system management servers includes nodes that are located on multiple physical networks.

15. The computer program product of claim 1, the operations further comprising:
    transferring a node from a first one of the group of nodes, which is assigned to a first one of the system management servers, to a second one of the group of nodes, which is assigned to a second one of the system management servers; and
    transferring management credentials for the transferred node from the first system management server to the second system management server.

16. The computer program product of claim 1, the operations further comprising:
    detecting the presence of a new node in the computer system;
    identifying a value of the one or more node operating factors for the new node;
    assigning the new node to a first one of the groups of nodes based upon the value of the one or more node operating factor identified for the new node; and managing the new node with a first one of the system management servers to which the first one of the groups of nodes has been assigned.

17. The computer program product of claim 1, wherein the dividing the plurality of nodes into groups based on the value of the one or more node operating factors comprises dividing the plurality of nodes into groups wherein each of the nodes in a group has the same value of the one or more node operating factors.

18. An apparatus, comprising:
   at least one non-volatile storage device storing program instructions; and
   at least one processor configured to process the program instructions, wherein the program instructions are configured to, when processed by the at least one processor, cause the apparatus to perform operations comprising:
   identifying a plurality of system management servers in a computer system and a node management capacity for each system management server;
   identifying a plurality of nodes in the computer system and a value of one or more node operating factors for each node, wherein the one or more node operating factors are selected from the group consisting of a hardware type, a software configuration, a user attribute, a workload type, geographic location and combinations thereof;
   dividing the plurality of nodes into groups based on the value of the one or more node operating factors;
   assigning, for each of the groups of nodes, the group of nodes to a selected one of the system management servers, wherein a sum of the nodes assigned to each system management server does not exceed the node management capacity of the system management server; and
   managing, for each system management server, each node that is in any of the groups of nodes that are assigned to the system management server.

19. The apparatus of claim 18, wherein the one or more node operating factors includes two or more node operating factors, and wherein the plurality of nodes are divided into groups based on the value of each of the two or more node operating factors.

20. The apparatus of claim 19, the operations further comprising:
   selecting a first of the two or more node operating factors as a primary node operating factor and a second of the two or more node operating factors as a secondary node operating factor, wherein assigning each one of the groups of nodes to one of the system management servers includes:
   assigning the groups of nodes based on the value of the primary node operating factor to a particular one of the system management servers until there is an insufficient remaining amount of the node management capacity on the particular system management server to manage a further one of the groups of nodes based on the value of the primary node operating factor.

21. The apparatus of claim 20, the operations further comprising:
   after there is an insufficient remaining amount of the node management capacity on the particular system management server to manage a further one of the groups of nodes based on the of the primary node operating factor, assigning additional groups of nodes based on the value of the primary node operating factor to a different one of the system management servers.

22. The apparatus of claim 18, wherein the dividing the plurality of nodes into groups based on the value of the one or more node operating factors comprises dividing the plurality of nodes into groups wherein each of the nodes in a group has the same value of the one or more node operating factors.

* * * * *